United States Patent
Matsunaga et al.

(10) Patent No.: US 11,822,313 B2
(45) Date of Patent: Nov. 21, 2023

(54) SYNCHRONIZATION CONTROL DEVICE, SYNCHRONIZATION CONTROL SYSTEM, SYNCHRONIZATION CONTROL METHOD, AND SIMULATION DEVICE

(71) Applicant: OMRON Corporation, Kyoto (JP)

(72) Inventors: Daisuke Matsunaga, Kizugawa (JP); Hidehiko Sekimoto, Nagaokakyo (JP); Toru Kogawara, Kyoto (JP); Junji Shimamura, Pleasanton, CA (US)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 17/298,856

(22) PCT Filed: Dec. 10, 2019

(86) PCT No.: PCT/JP2019/048289
§ 371 (c)(1),
(2) Date: Jun. 1, 2021

(87) PCT Pub. No.: WO2020/137522
PCT Pub. Date: Jul. 2, 2020

(65) Prior Publication Data
US 2021/0373530 A1    Dec. 2, 2021

(30) Foreign Application Priority Data

Dec. 27, 2018  (JP) .................................. 2018-246019
Sep. 6, 2019   (JP) .................................. 2019-163280

(51) Int. Cl.
*G05B 19/414*    (2006.01)
*G05B 19/404*    (2006.01)
*G05B 19/406*    (2006.01)

(52) U.S. Cl.
CPC ......... *G05B 19/414* (2013.01); *G05B 19/404* (2013.01); *G05B 19/406* (2013.01)

(58) Field of Classification Search
CPC .. G05B 19/414; G05B 19/404; G05B 19/406; G05B 19/4069; G05B 19/4141;
(Continued)

(56) References Cited

U.S. PATENT DOCUMENTS

2003/0090230 A1 * 5/2003 Fujibayashi ........... G05B 19/19
                                                     318/625
2004/0128022 A1 * 7/2004 Fujibayashi ....... G05B 19/4103
                                                     700/213
(Continued)

FOREIGN PATENT DOCUMENTS

EP    0943973 A1    9/1999
EP    1659464 A2    5/2006
(Continued)

OTHER PUBLICATIONS

International Search Report issued in Intl. Appln. No. PCT/JP2019/048289 dated Mar. 3, 2020. English translation provided.
(Continued)

*Primary Examiner* — Kenneth M Lo
*Assistant Examiner* — Mohammed Shafayet
(74) *Attorney, Agent, or Firm* — ROSSI, KIMMS & McDOWELL LLP

(57) ABSTRACT

A synchronization control device (10) includes: a main axis command calculator (Cmm) that calculates a main axis command position based on time-series target position information; a main axis modeler (Mm) that calculates a predicted main axis feedback position by a dynamic characteristic model of a main axis servo control mechanism (20) by inputting the main axis command position, a main axis feedback position, and a predicted main axis command
(Continued)

position after a predetermined time calculated based on the target position information; and a driven axis command calculator (Cms) that calculates a driven axis command position based on the predicted main axis feedback position. This configuration achieves synchronization control that improves the accuracy of synchronous drive of the driven axis.

9 Claims, 12 Drawing Sheets

(58) Field of Classification Search
CPC .......... G05B 2219/34095; G05B 2219/34399; G05B 2219/50218; G05B 2219/50229; H02P 6/34; H02P 5/46; Y02P 90/02
See application file for complete search history.

(56) References Cited

U.S. PATENT DOCUMENTS

| 2006/0144187 | A1  | 7/2006  | Maeda |              |
|--------------|-----|---------|-------|--------------|
| 2007/0142966 | A1* | 6/2007  | Mirza | G05B 19/4142 |
|              |     |         |       | 700/245      |
| 2013/0134919 | A1* | 5/2013  | Takayama | G05B 19/416 |
|              |     |         |       | 318/625      |
| 2017/0315534 | A1* | 11/2017 | Horiguchi | G05B 19/4103 |
| 2018/0210407 | A1  | 7/2018  | Namie |              |
| 2018/0314233 | A1* | 11/2018 | Horiguchi | G05B 13/027 |

FOREIGN PATENT DOCUMENTS

| JP | 3551328    | B2 | 8/2004  |
|----|------------|----|---------|
| JP | 2004328829 | A  | 11/2004 |
| JP | 2006172438 | A  | 6/2006  |
| JP | 2010022145 | A  | 1/2010  |
| JP | 2018120327 | A  | 8/2018  |
| WO | 2016185590 | A1 | 11/2016 |

OTHER PUBLICATIONS

Written Opinion issued in Intl. Appln. No. PCT/JP2019/048289 dated Mar. 3, 2020. English translation provided.
Extended European Search Report issued in European Appln. No. 19906291.0 dated Jul. 1, 2022.

* cited by examiner

SYNCHRONIZATION CONTROL DEVICE, SYNCHRONIZATION CONTROL SYSTEM, SYNCHRONIZATION CONTROL METHOD, AND SIMULATION DEVICE

TECHNICAL FIELD

The present invention relates to a synchronization control device, a synchronization control system, a synchronization control method, and a simulation device that perform synchronization control.

BACKGROUND ART

A technique of performing synchronization control of a plurality of servomotors such as machine tools is known. In the synchronization control, in order to operate the driven axis in synchronization with the main axis, position information (main axis feedback position) of the main axis is given as a driven axis command position to the driven axis servo control mechanism.

Furthermore, Patent Document 1 discloses that, in order to compensate for the synchronization delay of the driven axis, a future position prediction value of the main axis is calculated from the dynamic characteristic model of the main axis control system and input/output values (main axis command position and main axis feedback position), and the driven axis command position is calculated based on the calculation result, thereby improving the accuracy of the synchronous drive.

PRIOR ART DOCUMENT

Patent Document

Patent Document 1: Japanese Patent No. 3551328

SUMMARY OF THE INVENTION

Problems to be Solved by the Invention

However, in the prior art of Patent Document 1, since the future position prediction value of the main axis is calculated from the main axis command position and the main axis feedback position up to the present, the accuracy of the future position prediction value of the main axis is not necessarily excellent. Therefore, further improvement is required for the synchronization of the driven axis in a case where the main axis moves with a change in speed such as decelerating and stopping.

One aspect of the present invention has been made in view of the above problems, and an object of the present invention is to realize synchronization control that further improves the accuracy of synchronous drive of the driven axis.

Means for Solving the Problem

A synchronization control device according to one aspect of the present invention includes: a main axis command calculator that calculates a main axis command position with respect to a main axis servo control mechanism based on time-series target position information with respect to the main axis servo control mechanism; a main axis modeler that calculates a predicted main axis feedback position of the main axis servo control mechanism by a dynamic characteristic model of the main axis servo control mechanism by inputting the main axis command position, a main axis feedback position of the main axis servo control mechanism, and a predicted main axis command position after a predetermined time calculated based on the target position information; and a driven axis command calculator that calculates a driven axis command position with respect to a driven axis servo control mechanism based on a predicted main axis feedback position of the main axis servo control mechanism calculated by the main axis modeler.

According to the above configuration, even in a case where the main axis moves with a change in speed such as decelerating and stopping, it is possible to improve the accuracy of synchronization of the driven axis. Accordingly, it is possible to achieve synchronization control with improved accuracy of synchronous drive of the driven axis.

The synchronization control device may be configured to further include: a recorder that stores information of a dynamic characteristic model of a servo control mechanism of a plurality of models, and a dynamic characteristic model information acquisitor that selects and acquires information of a dynamic characteristic model of the main axis servo control mechanism from information of the dynamic characteristic model of the servo control mechanism of the plurality of models stored in the recorder.

According to the above configuration, it becomes easy to set various servo control mechanisms to appropriately perform synchronization control using the synchronization control device.

The synchronization control device may be configured to further include a dynamic characteristic model information acquisitor that acquires information of a dynamic characteristic model of the main axis servo control mechanism via a communication network.

According to the above configuration, it becomes easy to set various servo control mechanisms to appropriately perform synchronization control using the synchronization control device.

The synchronization control device may be configured to further include a model information acquisitor that acquires model information of the main axis servo control mechanism connected to the synchronization control device, and the dynamic characteristic model information acquisitor acquires dynamic characteristic model information corresponding to model information acquired by the model information acquisitor.

According to the above configuration, various servo control mechanisms are automatically set to appropriately perform synchronization control by using the synchronization control device, thereby further enhancing user convenience.

The synchronization control device may be configured to further include a dynamic characteristic model information generator that generates a dynamic characteristic model of the main axis servo control mechanism by operating the main axis servo control mechanism connected to the synchronization control device.

According to the above configuration, even in a case where the setting parameter of the main axis servo control mechanism connected to the synchronization control device is unknown, setting for appropriately performing synchronization control becomes easy by using the synchronization control device.

In the synchronization control device, the driven axis servo control mechanism may have a plurality of control axes. The synchronization control device may be configured to further include: a switch unit that switches between synchronization control of the main axis servo control mechanism and the driven axis servo control mechanism, in which processing by the main axis command calculator, processing by the main axis modeler, and processing by the main axis command calculator are performed, and non-synchronization control in which the synchronization control is not performed; and a switch time command calculator that calculates the driven axis command position with respect to the driven axis servo control mechanism so that acceleration of at least one control axis of the plurality of control axes of the driven axis servo control mechanism continuously changes in a first transition period immediately before the switch unit switches from the non-synchronization control to the synchronization control and/or in a second transition period immediately after the synchronization control is switched to the non-synchronization control.

According to the above configuration, when switching between synchronization control and non-synchronization control, the servo control is performed so as to suppress the occurrence of discontinuous change in acceleration of the driven axis servo control mechanism, i.e., steep jerk in the first transition period at the time of non-synchronization control immediately before entering the synchronization control and/or in the second transition period at the time of non-synchronization control immediately after the synchronization control is released. As a result, it is possible to suitably suppress vibration of the driven axis servo control mechanism at the time of switching, and it is possible to smoothly achieve the transition between synchronization control and non-synchronization control.

In the synchronization control device, the switch time command calculator may be configured to calculate the driven axis command position with respect to the driven axis servo control mechanism so that acceleration of all control axes of the plurality of control axes of the driven axis servo control mechanism continuously changes in the first transition period and/or the second transition period.

According to the above configuration, it is possible to suitably suppress vibration of all the control axes of the driven axis servo control mechanism at the time of switching, and it is possible to smoothly achieve transition between synchronization control and non-synchronization control.

A simulation device according to one aspect of the present invention is a simulation device connected to the synchronization control device according to any of the above, the simulation device including: a simulation processor that executes simulation of the main axis feedback position in the main axis servo control mechanism and a driven axis feedback position in the driven axis servo control mechanism with respect to the plurality of predetermined times different from each other, by simulating operations of the main axis command calculator, the main axis modeler, the driven axis command calculator, the main axis servo control mechanism, and the driven axis servo control mechanism for the plurality of predetermined times different from each other; a display that displays a plurality of simulation results with respect to the plurality of predetermined times different from each other by the simulation processor; a receiver that receives, from a user, an input that selects any of the plurality of simulation results; and a transmitter that transmits a parameter corresponding to a simulation result received by the receiver to the synchronization control device.

According to the above configuration, it is possible to easily perform setting for appropriately performing synchronization control in the synchronization control device.

A synchronization control system according to one aspect of the present invention includes any of the synchronization control devices, a main axis servo control mechanism connected to the synchronization control device, and a driven axis servo control mechanism connected to the synchronization control device.

According to the above configuration, even in a case where the main axis moves with a change in speed such as decelerating and stopping, it is possible to improve the accuracy of synchronization of the driven axis. Accordingly, it is possible to achieve synchronization control with improved accuracy of synchronous drive of the driven axis.

A synchronization control method according to one aspect of the present invention has: a main axis command calculation step of calculating a main axis command position with respect to a main axis servo control mechanism based on time-series target position information with respect to the main axis servo control mechanism; a main axis model calculating step of calculating a predicted main axis feedback position of the main axis servo control mechanism by a dynamic characteristic model of the main axis servo control mechanism by inputting the main axis command position, a main axis feedback position of the main axis servo control mechanism, and a predicted main axis command position after a predetermined time calculated based on the target position information; and a driven axis command calculation step of calculating a driven axis command position with respect to a driven axis servo control mechanism based on a predicted main axis feedback position of the main axis servo control mechanism calculated by the main axis model calculating step.

According to the above configuration, even in a case where the main axis moves with a change in speed such as decelerating and stopping, it is possible to improve the accuracy of synchronization of the driven axis. Accordingly, it is possible to achieve synchronization control with improved accuracy of synchronous drive of the driven axis.

In the synchronization control method, the driven axis servo control mechanism may have a plurality of control axes, and the synchronization control method may further have: a step of switching between synchronization control of the main axis servo control mechanism and the driven axis servo control mechanism, in which processing by the main axis command calculator, processing by the main axis modeler, and processing by the main axis command calculator are performed, and non-synchronization control in which the synchronization control is not performed; and a step of calculating the driven axis command position with respect to the driven axis servo control mechanism so that acceleration of at least one control axis of the plurality of control axes of the driven axis servo control mechanism continuously changes in a first transition period immediately before the switch unit switches from the non-synchronization control to the synchronization control and/or in a second transition period immediately after the synchronization control is switched to the non-synchronization control.

According to the above configuration, it is possible to suitably suppress vibration of the driven axis servo control mechanism at the time of switching, and it is possible to smoothly achieve the transition between synchronization control and non-synchronization control.

Effect of the Invention

According to the synchronization control device, the synchronization control system, the synchronization control method, and the simulation device of the present invention, it is possible to achieve synchronization control with improved accuracy of synchronous drive of the driven axis.

BRIEF DESCRIPTION OF THE DRAWINGS

FIGS. 4A and 4D are graphs of position, FIGS. 4B and 4E are graphs of speed, and FIGS. 4C and 4F are graphs of position deviation.

MODE FOR CARRYING OUT THE INVENTION

First Embodiment

An embodiment according to one aspect of the present invention will be described below with reference to FIGS. 1 to 3.

(Equipment Configuration of Synchronization Control System 1)

Figure 1:
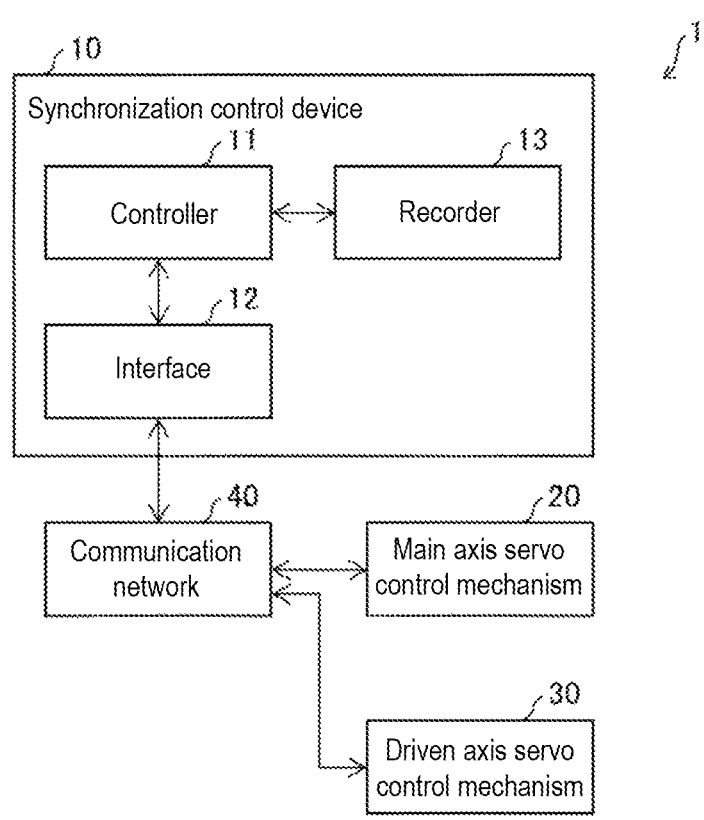
FIG. 1 is a schematic diagram showing a synchronization control system and a synchronization control device according to a first embodiment of the present invention.

FIG. 1 is a schematic diagram showing an overall equipment configuration of the synchronization control system 1 according to the first embodiment. The synchronization control system 1 includes a synchronization control device 10 according to the first embodiment, a main axis servo control mechanism 20, a driven axis servo control mechanism 30, and a communication network 40 that mediates communication among those devices.

The first embodiment is explained with an example in which the synchronization control device 10 controls two pieces of control target equipment of the main axis servo control mechanism 20 and the driven axis servo control mechanism 30. However, the synchronization control device 10 may control more pieces of equipment.

The synchronization control device 10 has a controller 11, an interface 12, and a recorder 13. The interface 12 communicates with other devices via the communication network 40. The recorder 13 can store a motion control program and the like for execution by the controller 11. The recorder 13 can hold dynamic characteristic models of various pieces of control target equipment.

The synchronization control device 10 that performs synchronization control includes the controller 11 that calculates a driven axis command position u of the driven axis servo control mechanism 30 for each cycle by using a main axis feedback position ym of the main axis servo control mechanism 20 or the like. The synchronization control device 10 transmits the driven axis command position u to the driven axis servo control mechanism 30 for each cycle, and synchronizes the driven axis servo control mechanism 30 with the main axis servo control mechanism 20.

The synchronization control device 10 is, for example, a programmable logic controller (PLC). The recorder 13 is, for example, a semiconductor memory, a magnetic memory such as a hard disk, or another recording medium. The main axis servo control mechanism 20 and the driven axis servo control mechanism 30 are, for example, a servo control stage and a robot arm. More specifically, the operation of gripping a workpiece on the servo control stage by the robot arm is an example requiring synchronization control.

(Configuration of Control)

Figure 2:
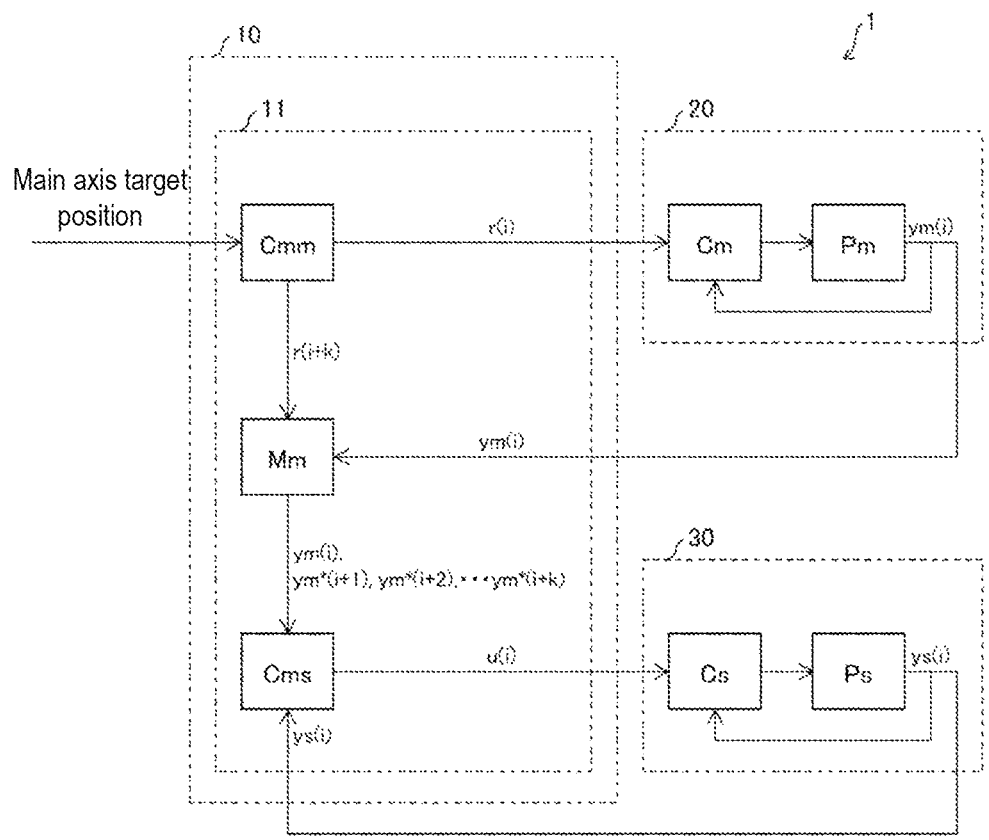
FIG. 2 is a control block diagram expressing the control logic of the synchronization control system and the synchronization control device according to the first embodiment of the present invention.

FIG. 2 is a control block diagram expressing the control logic when the synchronization control device 10 according to the first embodiment performs control for the main axis servo control mechanism 20 and the driven axis servo control mechanism 30.

The main axis servo control mechanism 20 includes a main axis motor Pm (main axis) such as a servomotor, and a main axis controller Cm that controls the main axis motor Pm. The main axis motor Pm includes, for example, an encoder to output a main axis feedback position ym, which is position information of the main axis. The main axis controller Cm performs feedback control of the main axis motor Pm using the main axis feedback position ym in accordance with a main axis command position r from the synchronization control device 10.

The driven axis servo control mechanism 30 includes a driven axis motor Ps (driven axis) such as a servomotor, and a driven axis controller Cs that controls the driven axis motor Ps. The driven axis motor Ps includes, for example, an encoder to output a driven axis feedback position ys, which is position information of the driven axis. The driven axis controller Cs performs feedback control of the driven axis motor Ps using the driven axis feedback position ys in accordance with the driven axis command position u from the synchronization control device 10.

In the synchronization control device 10, the controller 11 includes the main axis command calculator Cmm, a main axis modeler Mm, and a driven axis command calculator Cms as functional blocks. In other words, the controller 11 executes the motion control program held in the recorder 13, for example, to achieve the function of each unit. The main axis command position r calculated by the main axis command calculator Cmm is transmitted to the main axis controller Cm. The main axis modeler Mm receives the main axis feedback position ym from the main axis motor Pm. The driven axis command position u calculated by the driven axis command calculator Cms is transmitted to the driven axis controller Cs.

FIG. 2 shows a value transmitted from one block to another in a specific period i. For example, in the period i, a main axis command position r(i) is input to the main axis controller Cm, and the main axis motor Pm outputs a main axis feedback position ym(i). The main axis controller Cm controls the operation of the main axis motor Pm based on the main axis command position r and the main axis feedback position ym that are sequentially input. This is normal feedback control.

Next, the internal configuration and operation of the controller 11 of the synchronization control device 10 will be described in detail with reference to FIGS. 2 and 3.

The main axis command calculator Cmm reads the main axis target position from the motion control program or the like stored in the recorder 13 and defining the operation of the main axis and the like, and calculates the main axis command position r (main axis command calculation step).

Figure 3:
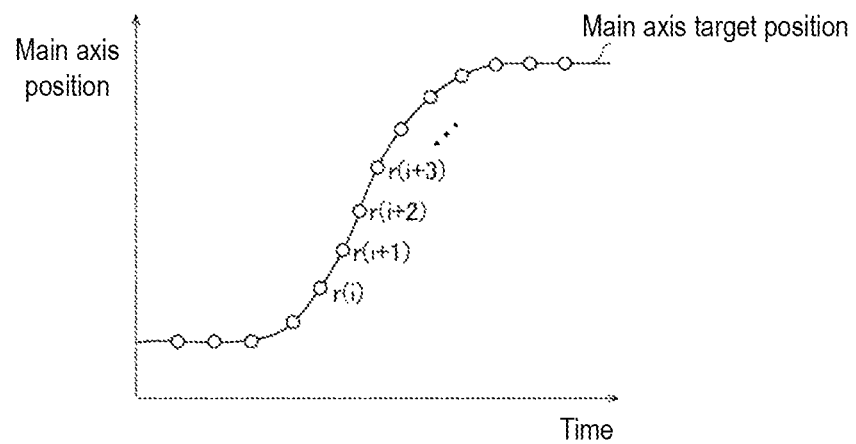
FIG. 3 is a diagram for explaining the operation of a main axis command calculator Cmm of a controller of the synchronization control system according to the first embodiment of the present invention.

FIG. 3 is a graph for explaining the calculation method. The main axis command calculator Cmm figures out the main axis target position for each unit period from the main axis target position, which is time-series target position information with respect to the main axis servo control mechanism, and judges it as main axis command positions r(i), r(i+1), r(i+2) . . . for each period.

In the period i, the main axis command calculator Cmm outputs the main axis command position r(i) of the period i to the main axis controller Cm, and outputs the main axis command position r(i+k) (predicted main axis command position after a predetermined time) of the period i+k to the main axis modeler Mm. Here, the period i+k is a future period after k unit periods from the period i.

The main axis modeler Mm includes a dynamic characteristic model of the main axis servo control mechanism 20 that estimates the main axis feedback position from the main axis command position r with reference to the main axis feedback position ym.

In the period i, the main axis modeler Mm simulates predicted main axis feedback positions ym*(i+1), ym*(i+2), . . . ym*(i+k), which are future main axis feedback positions up to the period i+k, from the main axis command position r up to the period i+k and the main axis feedback position ym up to the period l, which have been received from the main axis command calculator Cmm, and outputs them to the driven axis command calculator Cms (main axis model calculation step).

The driven axis command calculator Cms calculates a driven axis command position u(i) in the period i from the driven axis command position u up to the period i, the driven axis feedback position ys, and the predicted main axis feedback positions ym*(i+1), ym*(i+2), . . . ym*(i+k), and outputs it to the driven axis controller Cs (driven axis command calculation step). The driven axis command position u(i) to be calculated is a value adjusted using the other value described above from the main axis feedback position ym(i).

The driven axis command calculator Cms can be configured to perform the same calculation processing as that by a combination of a converter and a prediction controller of the comparative example (prior art) described later, but another known technique may be applied as appropriate.

Thus, the predicted value of the future main axis feedback position given to the driven axis command calculator Cms is a value simulated by the dynamic characteristic model of the main axis servo control mechanism 20 from the future main axis command position r. Here, the future main axis command position r is a correct value actually provided to the main axis servo control mechanism 20. It is possible to accurately construct the dynamic characteristic model of the main axis servo control mechanism 20 by a known and established method. Therefore, the predicted value of the future main axis feedback position becomes highly accurate. Therefore, the synchronization control device 10 according to the first embodiment can improve the accuracy of synchronous drive of the driven axis.

Comparative Example

Figure 8:
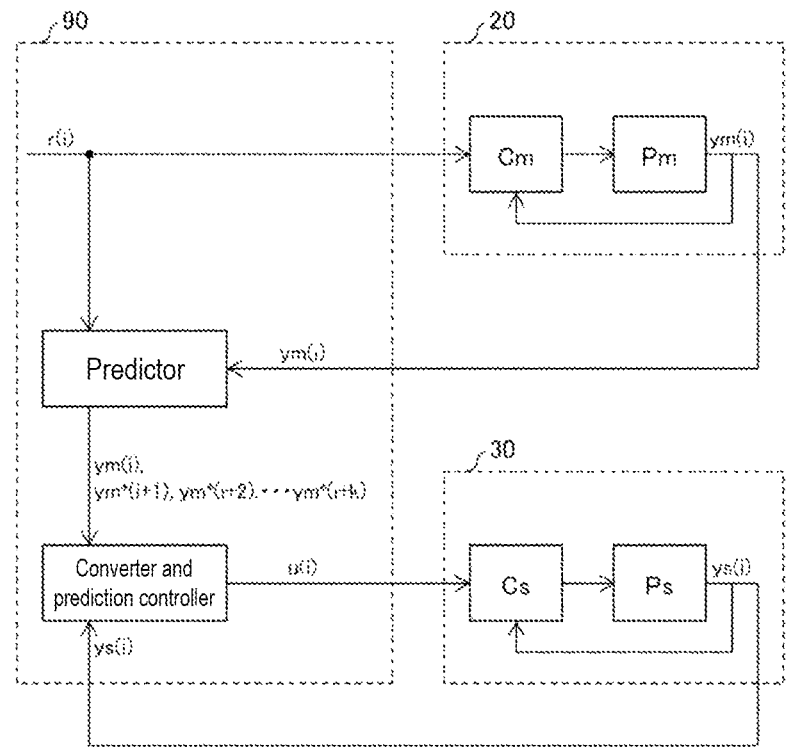
FIG. 8 is a control block diagram expressing the control logic of the synchronization control device of the comparative example.

A system in which a synchronization control device 90 using the prior art of Patent Document 1 shown in FIG. 8 performs synchronization control will be described as a comparative example.

In the synchronization control device 90 of the comparative example, in the period i, a predictor calculates the predicted main axis feedback positions ym*(i+1), ym*(i+2), . . . ym*(i+k) by the main axis command position r up to the period i and the main axis feedback position ym. The converter and the prediction controller (corresponds to the driven axis command calculator Cms of the synchronization control device 10) calculate the driven axis command position u(i) in the period i from the driven axis command position u up to the period i, the driven axis feedback position ys, and the predicted main axis feedback positions ym*(i+1), ym*(i+2), . . . ym*(i+k), and output it to the driven axis controller Cs.

Thus, in the synchronization control device 90 of the comparative example, the predicted main axis feedback positions ym*(i+1), ym*(i+2), . . . ym*(i+k) given to the converter and the prediction controller are calculated from the main axis command position r and the main axis feedback position ym up to the present. Therefore, the synchronization control device 90 is inferior in accuracy to the synchronization control device 10 according to the first embodiment. Therefore, the accuracy of the synchronous drive of the driven axis is inferior to that of the synchronization control device 10.

FIGS. 4A-4F are views showing an example of a result comparison in a case of performing synchronization control by the synchronization control device 10 according to the first embodiment and the synchronization control device 90 of the comparative example.

Figure 4:
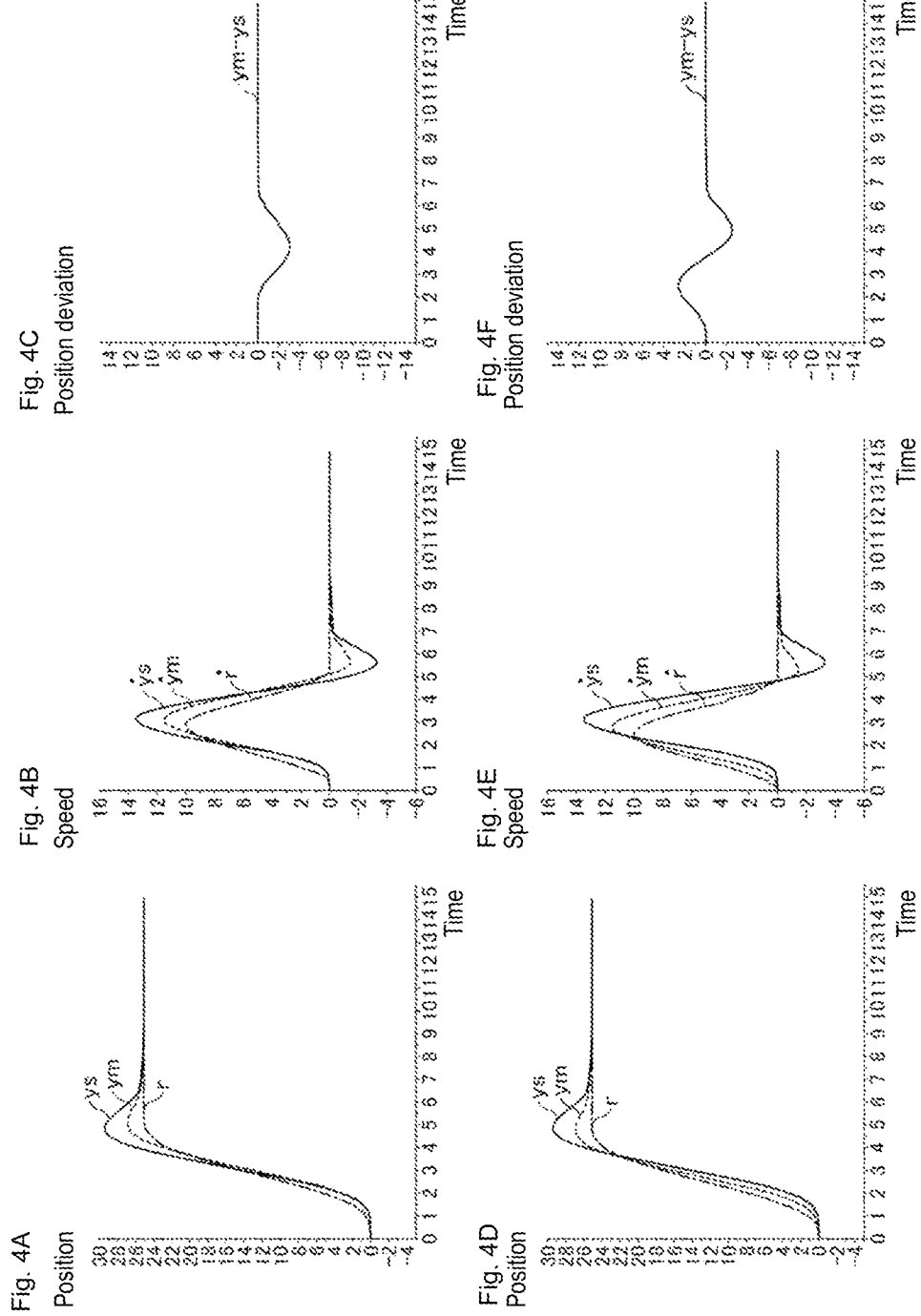
FIGS. 4A to 4C are result examples of a case of performing synchronization control by the synchronization control device according to the first embodiment.
FIGS. 4D to 4F are result examples of a case of performing synchronization control by a synchronization control device of a comparative example.

An example of the transition of the main axis command position r, the main axis feedback position ym, and the driven axis feedback position ys in the synchronization control device 10 is shown in FIG. 4A, and a similar graph in the synchronization control device 90 is shown in FIG. 4D.

FIGS. 4B and 4E each show time derivative (speed) of the main axis command position r, the main axis feedback position ym, and the driven axis feedback position ys in the synchronization control device 10 and the synchronization control device 90, respectively. As shown in these graphs, the present example is an example in a case of performing control of accelerating the main axis and then decelerating it.

FIGS. 4C and 4F each show position deviation ym–ys between the main and driven in the synchronization control device 10 and the synchronization control device 90, respectively.

As is clear from comparison between FIGS. 4B and 4E, use of the synchronization control device 10 according to the first embodiment causes the timing of change in speed of the main axis and the timing of change in speed of the driven axis to coincide more, and synchronization to be performed more appropriately. As shown in FIG. 4F, in the synchronization control device 90 of the prior art, the driven axis is not only delayed from the main axis but also sometimes overtakes the main axis, and thus the follow-up is not smooth, whereas in the synchronization control device 10 according to the first embodiment, the follow-up is smoother.

In a case of operating the main axis in a state with no or small acceleration/deceleration in a certain direction, the synchronization control device 90 of the comparative example can perform synchronization control with relatively accurately. However, particularly in a case of performing an operation of decelerating and inverting the movement of the main axis, the predicted value of the future main axis feedback position calculated from the main axis command position r and the main axis feedback position ym up to the present becomes inaccurate, and the follow-up accuracy of the driven axis position is greatly reduced.

On the other hand, in the synchronization control device 10 according to the first embodiment, even in such a case, the follow-up accuracy of the driven axis position is high because the driven axis command position u(i) can be calculated taking into account that an inversion operation will be performed in the future. The synchronization control device 10 can enhance the accuracy of synchronization control by flexibly responding to various main axis operations.

Second Embodiment

Other embodiments of the present invention will be described below. For convenience of explanation, components having the same functions as components described in the above embodiment are given the same reference numerals, and the description thereof will not be repeated.

Figure 5:
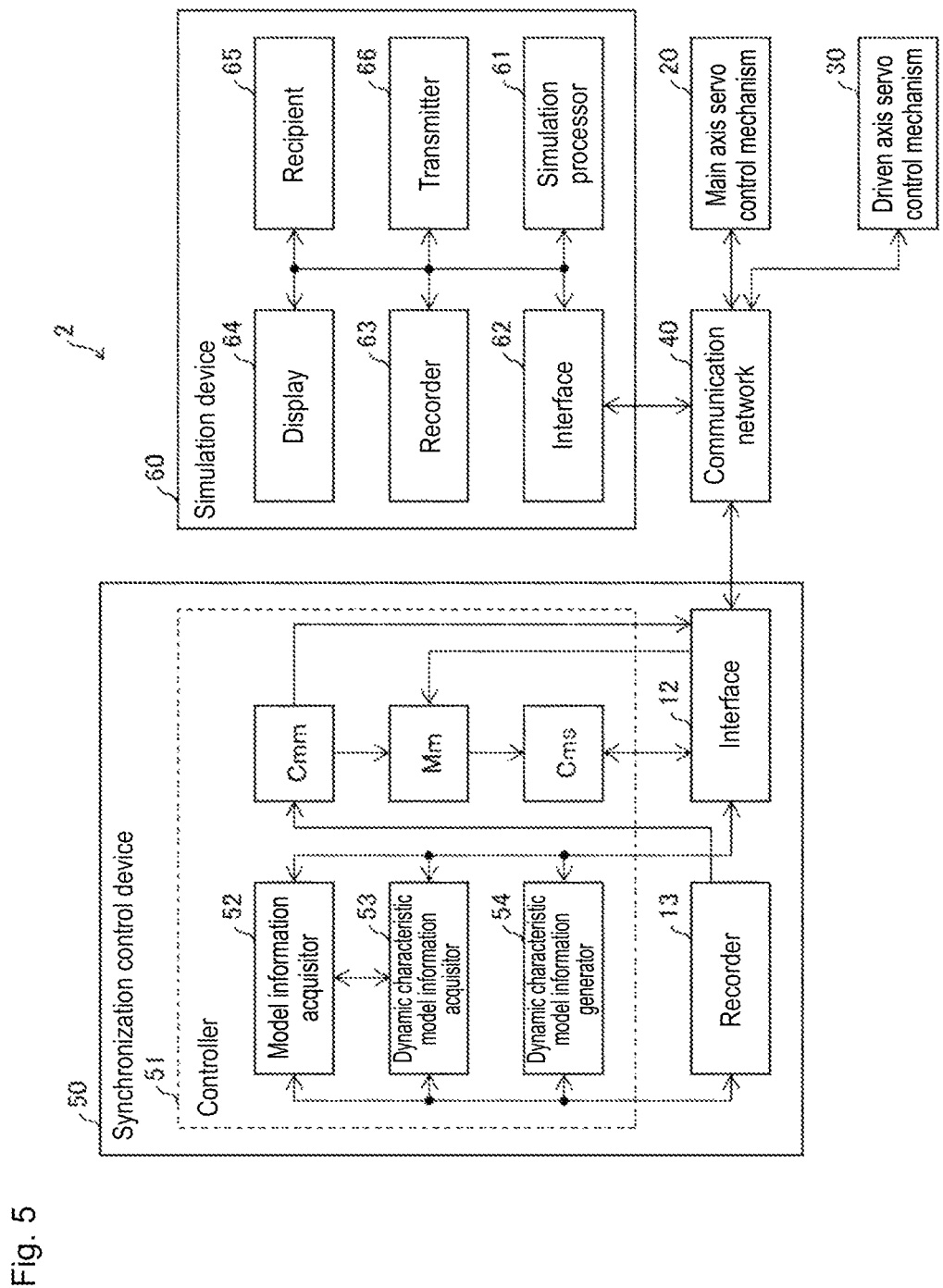
FIG. 5 is a schematic diagram showing a synchronization control system and a synchronization control device according to second to fifth embodiments of the present invention.

FIG. 5 is a schematic diagram showing an overall equipment configuration of a synchronization control system 2 according to another embodiment. A controller 51 of a synchronization control device 50 of the synchronization control system 2 includes, in addition to the functional blocks of the controller 11 according to the first embodiment, the functional blocks of a model information acquisitor 52, a dynamic characteristic model information acquisitor 53, and a dynamic characteristic model information generator 54.

Furthermore, the synchronization control system 2 includes a simulation device 60 in addition to the configuration of the synchronization control system 1 according to the first embodiment. The simulation device 60 transmits/receives information to/from the synchronization control device 10 via the communication network 40. The simulation device 60 includes a simulation processor 61, an interface 62, a recorder 63, a display 64, a receiver 65, and a transmitter 66.

The simulation processor 61 simulates the control system shown in the block diagram of FIG. 2. The interface 62 communicates with other devices via the communication network 40. The recorder 63 holds dynamic characteristic models of various pieces of control target equipment. The display 64 displays various kinds of information such as a simulation result. The receiver 65 receives an operation to the simulation device 60 by the user. The transmitter 66 transmits information to the synchronization control device 50 through the interface 62.

Figure 6:
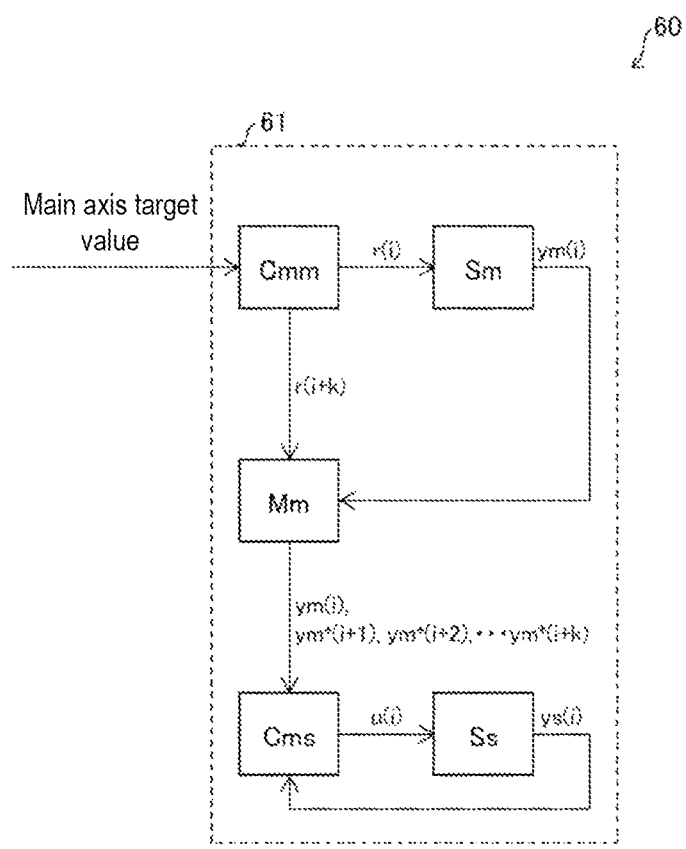
FIG. 6 is a schematic diagram showing the function of a controller of a simulation device of the synchronization control system according to the second to third embodiments of the present invention.

The operation of the simulation processor 61 will be described based on FIG. 6 showing the configuration of the simulation processor 61 of the simulation device 60.

Similarly to the controller 11 of the synchronization control device 10, the simulation processor 61 includes a main axis command calculator Cmm, a main axis modeler Mm, and a driven axis command calculator Cms. Furthermore, the simulation processor 61 further has functional blocks of a main axis servo control mechanism simulator Sm and a main axis servo control mechanism simulator Ss, which are operation models of the main axis servo control mechanism 20 and the driven axis servo control mechanism 30.

Instead of the actual main axis servo control mechanism 20 in the synchronization control system 1, the main axis servo control mechanism simulator Sm receives the main axis command position r from the main axis command calculator Cmm and outputs the main axis feedback position ym to the main axis modeler Mm.

Instead of the actual driven axis servo control mechanism 30 in the synchronization control system 1, the driven axis servo control mechanism simulator Ss receives the driven axis command position u from the driven axis command calculator Cms and outputs the driven axis feedback position ys to the driven axis command calculator Cms.

Such configuration enables the simulation processor 61 of the simulation device 60 to simulate the operation of the synchronization control system 1 shown in FIG. 2.

Next, a method of using the simulation device 60 in the synchronization control system 2 will be described.

When the user selects, from the receiver 65 of the simulation device 60, the type and the like of the main axis servo control mechanism 20 and the driven axis servo control mechanism 30 to perform synchronization control, a dynamic characteristic model corresponding to each piece of control target equipment is extracted from the recorder 63. Then, in the simulation processor 61, the dynamic characteristic model of the main axis servo control mechanism 20 is set in the main axis servo control mechanism simulator Sm and the main axis modeler Mm. The dynamic characteristic model of the driven axis servo control mechanism 30 is set in the driven axis servo control mechanism simulator Ss and the driven axis command calculator Cms.

Thus, the simulation device 60 become capable of freely performing the simulation of the operation of the synchronization control system including the main axis servo control mechanism 20 and the driven axis servo control mechanism 30 selected discretionally by the user. The display 64 displays the simulation result of the operation of the synchronization control system 1 by the simulation processor 61, and the user can confirm it.

The simulation in the simulation device 60 enables the user to select appropriate equipment for the work the user targets, and to examine in advance appropriate values of various parameters to decide, such as a unit period of control, a communication cycle among equipment, and a look-ahead time (k unit period) for prediction control.

After the user selects the equipment and decides the parameter through the receiver 65, the transmitter 66 of the simulation device 60 can transmit the dynamic characteristic models and the parameters of the main axis servo control mechanism 20 and the driven axis servo control mechanism 30 through the interface 62 to the synchronization control device 10.

In the second embodiment, the controller 51 of the synchronization control device 50 is provided with at least a function block of a dynamic characteristic model information acquisitor 53 in addition to the function block of the controller 11 according to the first embodiment. The functional blocks of the model information acquisitor 52 and the dynamic characteristic model information generator 54 shown in FIG. 5 may also be provided in the controller 51.

The dynamic characteristic model information acquisitor 53 of the synchronization control device 10 receives, through the interface 12, the dynamic characteristic model and each parameter of the main axis servo control mechanism 20 and the driven axis servo control mechanism 30 transmitted from the simulation device 60.

Furthermore, the dynamic characteristic model information acquisitor 53 sets these data and the main axis command calculator Cmm, the main axis modeler Mm, and the driven axis command calculator Cms of the controller 11 to the model and parameter decided in the simulation device 60. The dynamic characteristic model information acquisitor 53 appropriately stores these data in the recorder 13.

Thus, according to the second embodiment, the user can construct the synchronization control system after sufficiently examining the selection of equipment and the setting of parameters, thereby improving the convenience of the user.

Note that the simulation device 60 may be configured such that, when the user selects, from the receiver 65, the type and the like of the main axis servo control mechanism 20 and the driven axis servo control mechanism 30 to perform synchronization control, various parameters to be appropriately decided in the combination are acquired from a cloud server through the Internet line. It is also preferable to have a function of presenting the value of the acquired parameter to the user on the display 64 as a recommended value.

Third Embodiment

In the third embodiment, an example in which the user can easily decide a proper value for a look-ahead time decided from the period described in the first embodiment, i.e., a time difference between the period i+k and the period i will be described.

A longer look-ahead time does not necessarily improve the accuracy, and an optimum value exists in the look-ahead time in accordance with control target equipment and its combination. Therefore, if the user can easily know the proper value of the look-ahead time, the convenience for the user of the synchronization control system 2 is further improved.

The configurations of a synchronization control system 2 and a synchronization control device 50 according to the third embodiment are the same as those of the second embodiment.

Figure 7:
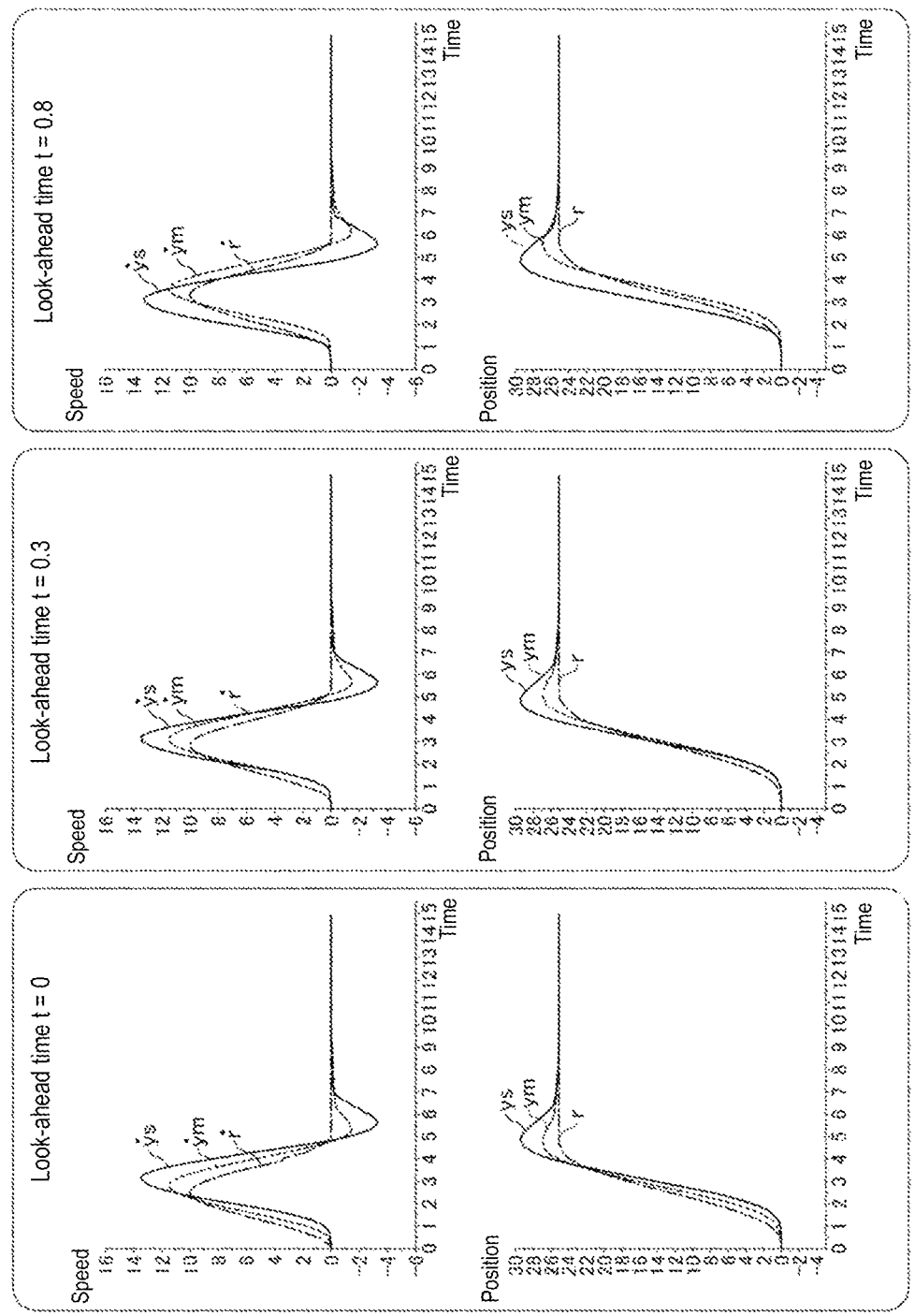
FIG. 7 is a view showing a screen example of a display of the simulation device of the synchronization control system according to the third embodiment of the present invention.

In the third embodiment, a simulation processor 61 has a function of displaying, on a display 64, a list of simulation results when the look-ahead time is changed. FIG. 7 is a view showing an example of such a display screen on the display 64. The results in a case of changing the look-ahead time in three ways are arranged in three columns, and in each column, the lower graph shows the position (a main axis command position r, a main axis feedback position ym, and a driven axis feedback position ys) and the upper graph shows the speed (time derivatives of the main axis command position r, the main axis feedback position ym, and the driven axis feedback position ys) simultaneously.

In a case shown in FIG. 7, when the look-ahead time is set to 0.3 (discretionary unit), the timing of the speed change of the main axis and the driven axis coincides with each other, which is the most appropriate. By visually recognizing the screen as shown in FIG. 7, the user becomes capable of easily knowing the proper value of the look-ahead time, which is a characteristic parameter regarding the synchronization control device of the present invention.

Thus, when the user selects, for example, 0.3 as the look-ahead time from the receiver, the transmitter 66 can transmit the look-ahead time to the synchronization control device 50 together with the dynamic characteristic model and other parameters employed by the selection of equipment.

Fourth Embodiment

In the second embodiment, the simulation device 60 has the dynamic characteristic models of various pieces of control target equipment in the recorder 63 included in the simulation device 60. On the other hand, in the fourth embodiment, a synchronization control device 50 holds the dynamic characteristic models of the various pieces of control target equipment in a recorder 13 of the synchronization control device 50. Therefore, in the synchronization control system according to the fourth embodiment, even without including a simulation device 60, it is possible to easily set the control logic corresponding to the selected piece of control target equipment in a controller 11 of a synchronization control device 10.

The configuration of the synchronization control system according to the fourth embodiment is that the synchronization control system 2 shown in FIG. 2 that does not necessarily include the simulation device 60. In the fourth embodiment, a controller 51 of the synchronization control device 50 is provided with at least a function block of a dynamic characteristic model information acquisitor 53 in addition to the function block of the controller 11 according to the first embodiment.

In the synchronization control device 10 according to the fourth embodiment, in accordance with a main axis servo control mechanism 20 and a driven axis servo control mechanism 30 selected by the user operation through a terminal or the like, the dynamic characteristic model information acquisitor 53 sets the control logic shown in FIG. 2 from the dynamic characteristic model held in the recorder 13.

Alternatively, as a variation, the controller 51 of the synchronization control device 10 according to the fourth embodiment is further provided with a functional block of a model information acquisitor 52. The model information acquisitor 52 recognizes the type of the connected main axis servo control mechanism 20 and the driven axis servo control mechanism 30 through the communication network via an interface 12. By doing so, in accordance with the recognized main axis servo control mechanism 20 and the driven axis servo control mechanism 30, the dynamic characteristic model information acquisitor 53 may set the control logic shown in FIG. 2 from the dynamic characteristic model held in the recorder 13.

Furthermore, it is also preferable that the synchronization control device 10 according to the fourth embodiment has a function in which the dynamic characteristic model information acquisitor 53 acquires, from a cloud server through the Internet line, various parameters to be appropriately decided in the combination of the models of the selected main axis servo control mechanism 20 and the driven axis servo control mechanism 30 and sets them in the controller 11 or presents them to the user as recommended values.

Fifth Embodiment

In the fourth embodiment, the synchronization control device 10 has the dynamic characteristic models of various pieces of control target equipment in the recorder 13. However, the control target equipment is sometimes unknown, and in that case, setting the control logic is troublesome.

The configuration of the synchronization control system according to the fifth embodiment is that the synchronization control system 2 shown in FIG. 2 that does not necessarily include the simulation device 60. In the fifth embodiment, a controller 51 of a synchronization control device 50 is provided with at least a function block of a dynamic characteristic model information generator 54 in addition to the function block of the controller 11 according to the first embodiment.

For example, in a case where a recorder 13 does not have a dynamic characteristic model of a main axis servo control mechanism 20, a synchronization control device 10 according to the fifth embodiment allows the dynamic characteristic model information generator 54 to transmit a test main axis command position to the main axis servo control mechanism 20, which is control target equipment. By doing so, the main axis servo control mechanism 20 is actually operated, and the dynamic characteristic model information generator 54 receives a main axis feedback position, which is a response from the main axis servo control mechanism 20 to the test main axis command position.

The dynamic characteristic model information generator 54 can construct a dynamic characteristic model of the control target equipment by analyzing the response of the control target equipment to the test main axis command position. The same applies to the case of not having a dynamic characteristic model of a driven axis servo control mechanism 30. The recorder 13 can hold the constructed dynamic characteristic model.

For a method of thus constructing a dynamic characteristic model from input/output of control target equipment, it is possible to use a known method in the control field as appropriate.

The synchronization control device 10 according to the fifth embodiment sets the control logic shown in FIG. 2 in the controller 11 from the dynamic characteristic model of the control target equipment thus obtained.

According to the synchronization control device according to the fifth embodiment, it is possible to easily set the control logic of the present invention in the controller 11 even in a case of not holding the dynamic characteristic model of the control target equipment.

Sixth Embodiment

Figure 9:
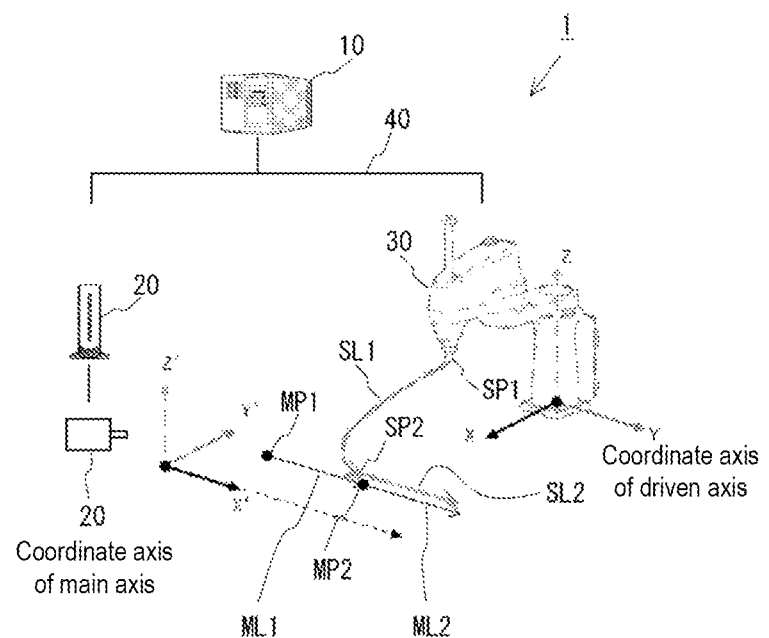
FIG. 9 is a schematic diagram showing a synchronization control system 1 and a synchronization control device according to a sixth embodiment of the present invention.
Figure 10:
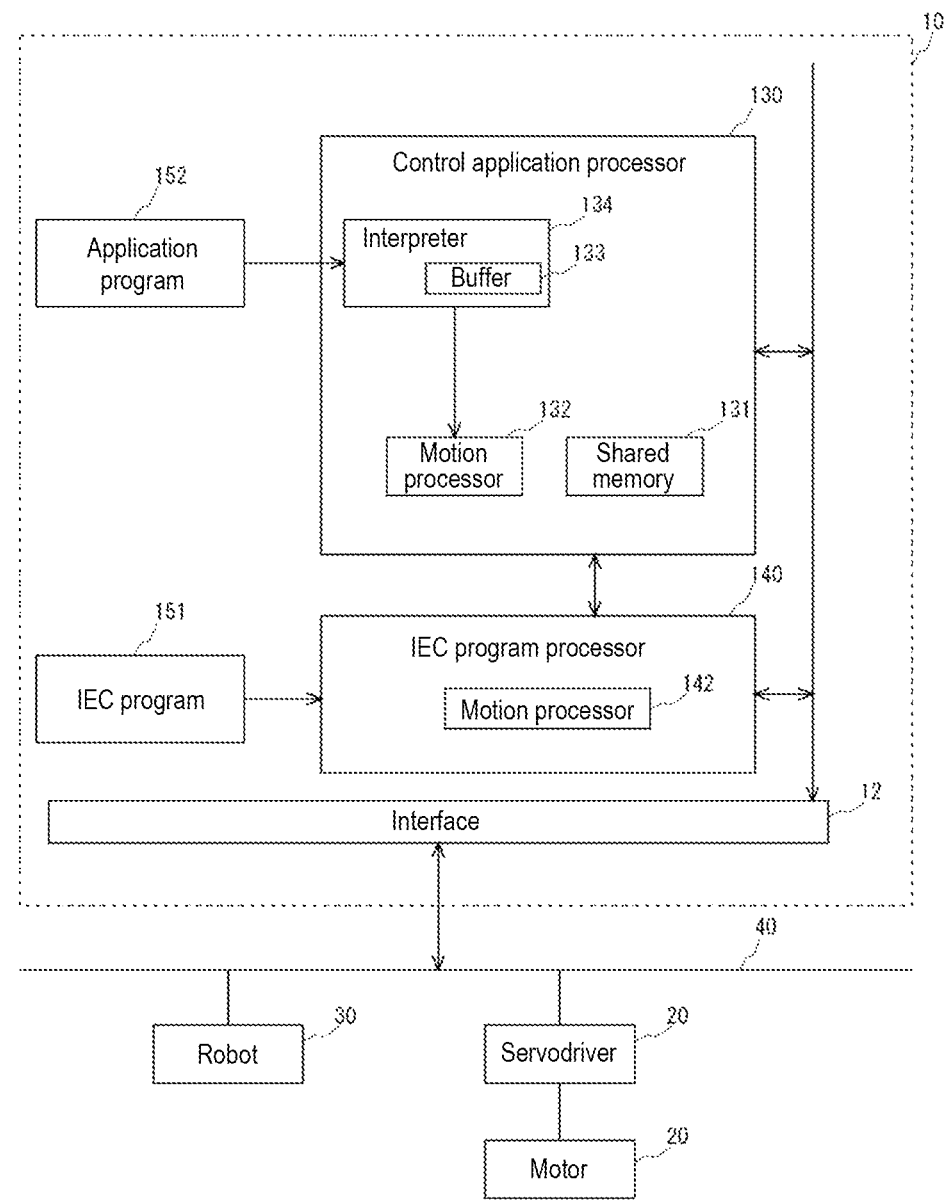
FIG. 10 is a functional block diagram visualizing the function of the synchronization control device shown in FIG. 9.

A synchronization control device 10 according to the sixth embodiment will be described based on FIGS. 9 to 14. Note that substantially identical components to those shown in the above embodiments are given identical reference numerals, and detailed description thereof will be omitted. FIG. 9 is a schematic configuration diagram of a control system 1 to which the synchronization control device 10 is applied. FIG. 10 is a view visualizing a function unit formed in the synchronization control device 10.

The synchronization control device 10 corresponds to an industrial controller that controls a control target (field equipment) such as various facilities and devices. The synchronization control device 10 is a kind of computer that executes a control calculation as described later. For the synchronization control device 10, a robot, a servo driver, and a motor are control targets. In the embodiment, synchronization control is performed among the robot, the servo driver, and the motor, and in the synchronization control, the servo driver and the motor are the main axis servo control mechanism, and the robot is the driven axis servo control mechanism. In the light of the above embodiments, the reference numeral of the servo driver and the motor is "20", and the reference numeral of the robot is "30". The servo driver 20 drives the motor 20 in accordance with output data (for example, position command and speed command) from the synchronization control device 10. Examples of the robot 30 include a parallel robot, a SCARA robot, and a multi-joint robot. Thus, the synchronization control device 10 is a control device configured to integrally perform servo control of the robot 30, the servo driver 20, and the motor 20.

The synchronization control device 10 exchanges data with one piece or a plurality of pieces of field equipment via the communication network 40 or the like. The synchronization control device 10 performs processing (input processing) of collecting data (hereinafter referred to as "input data") collected or generated in various field equipment, processing (calculation processing) of generating data (hereinafter referred to as "output data") such as a command for the field equipment, processing of transmitting (output processing) the generated output data to the target field equipment, and the like.

Here, it is preferable that the communication network 40 employs a bus or a network that performs constant cycle communication with a guaranteed data arrival time. As a bus or a network that performs constant cycle communication, EtherCAT (registered trademark) and the like are known. Then, via the communication network 40, the data exchanged between the synchronization control device 10 and the field equipment is updated in a very short cycle of the order of several 100 μsec to the order of several 10 msec. Note that the update processing of data thus exchanged is also referred to as input/output refresh processing.

Here, the configuration of the synchronization control device 10 will be described based on FIG. 10. Note that a control application processor 130 and an IEC program processor 140 shown in FIG. 10 are functional units formed in the controller 11 shown in FIG. 1, and an IEC program 151 and an application program 152 are programs stored in the recorder 13 shown in FIG. 1. Specifically, the synchronization control device 10 is a kind of computer that executes a predetermined control calculation as described above, and includes a processor and a memory necessary for the control calculation. The processor is one form of the controller 11 and includes a central processing unit (CPU), a micro processing unit (MPU), and a graphics processing unit (GPU). For the processor, a configuration having a plurality of cores may be employed, or a plurality of the processors may be arranged. The memory is one form of the recorder 13, and includes, for example, a volatile storage device such as a dynamic random access memory (DRAM) and a static random access memory (SRAM), and a nonvolatile storage device such as a hard disk drive (HDD) and a solid state drive (SSD). Then, the processor reads and executes various programs stored in the memory, thereby implementing a control in accordance with the control object and various processing as described later. The memory stores, in addition to a system program for implementing a basic function, a user program (IEC program 151 and application program 152) created in accordance with a control target manufacturing device or facility.

Note that the IEC program 151 in the present application is a program that is entirely scanned every time it is executed and in which one or a plurality of command values are calculated every time it is executed, and typically includes a program composed of one or a plurality of instructions described in accordance with the international standard IEC61131-3 specified by the International Electrotechnical Commission (IEC). The IEC program 151 includes instructions of sequence control and motion control. Such IEC program 151 corresponds to an execution format in which all programs are executed (scanned) for each control cycle, and is suitable for control requiring immediacy and high speed. On the other hand, the application program 152 in the present application is a control program for performing a specific process or operation using a robot, is inclusive of a program composed of one or a plurality of instructions for implementing a control application by the robot, and is basically distinguished from the IEC program 151. The application program 152 regarding robot control is described, as an example, using a robot language, and employs an interpreter system in which the application program is sequentially executed line by line.

As shown in FIG. 10, the synchronization control device 10 has the IEC program processor 140, the interface 12, and the control application processor 130. The interface 12 mediates data exchange between the IEC program processor 140 and the control application processor 130, and the field equipment connected via the communication network 40.

The IEC program processor 140 executes (scans) the IEC program 151 for each predetermined control cycle to calculate one or a plurality of command values. That is, the IEC program processor 140 calculates a command value for each control cycle in accordance with the IEC program 151. Note that in the present application, the IEC program 151 shall be executed for performing servo control of a predetermined device configured to include the motor 20. Then, a motion processor 142 provides a function of calculating a command value for each control cycle in accordance with a motion instruction included in the IEC program 151. That is, the motion instruction included in the IEC program 151 includes an instruction (for example, instruction for the output of a predetermined device including the motor 20 to draw any trajectory) that instructs a behavior over a plurality of control cycles. When such motion instruction is executed, the motion processor 142 calculates a command value for each control cycle in accordance with the instruction content of the executed motion instruction. That is, the motion processor 142 outputs a command value to the predetermined device for each control cycle, thereby achieving the behavior instructed by the motion instruction.

Next, the control application processor 130 calculates a command value for controlling the control application based on the application program 152 or the like. Note that in the present application, the control application processor 130 shall execute the application program 152 in order to perform servo control of the robot 30. The control application processor 130 can calculate and output a command value for the control application in synchronization with the calculation and output of the command value by the IEC program processor 140, or can calculate and output a command value for the control application not in synchronization with the calculation and output of the command value by the IEC program processor 140. That is, the control application processor 130 executes the calculation processing of the command value in synchronization with or not in synchronization with the calculation processing by the IEC program processor 140. Note that the synchronization processing of the IEC program processor 140 and the control application processor 130 will be described later.

An interpreter 134 interprets at least a part of the sequential application program 152 to generate an intermediate code, and has a buffer 133 that stores the generated intermediate code. The intermediate code in the present application is a concept including an instruction for calculating a command value for each control cycle, and may include one or a plurality of instructions or one or a plurality of functions. Then, a motion processor 132 calculates a command value for each control cycle in accordance with the intermediate code generated in advance by the interpreter 134 and stored in the buffer 133. In general, an instruction (code) described in the application program 152 is sequentially executed, and it is hence not possible to guarantee a calculation cycle of the command value. However, in the disclosure of the present application, by thus using the intermediate code, the motion processor 132 becomes capable of calculating the command value for each control cycle. The instruction described in the intermediate code may use a coordinate system corresponding to each control application.

Then, a shared memory 131 is provided in order to share data between the IEC program processor 140 and the control application processor 130. In the disclosure of the present application, a part or entirety of the processing result by the control application processor 130 is stored in the shared memory 131, and the IEC program processor 140 can refer to the data stored in the shared memory 131 of the control application processor 130. Data may also be written from the IEC program processor 140 to the shared memory 131 of the control application processor 130, and the data thus written from the IEC program processor 140 can be referred to from the interpreter 134 and the motion processor 132.

<Synchronous Execution of Programs>

The synchronization control device 10 implements synchronous execution of the IEC program 151 for performing servo control of the motor 20 and the application program 152 for performing servo control of the robot 30. Note that the synchronization control can be brought into a non-execution state as required for control, and the servo control of the motor 20 and the robot 30 in that case is also referred to as non-synchronization control. In the synchronization control, the interpreter 134 of the control application processor 130 sequentially executes the application program 152 for a cycle longer than the control cycle, for example, for a cycle twice the control cycle. However, the motion processor 142 of the IEC program processor 140 and the motion processor 132 of the control application processor 130 both calculate a command value for an identical control cycle. Therefore, the output of the command value from the synchronization control device 10 is performed in synchronization with each other in a predetermined control cycle. Thus, the IEC program processor 140 and the control application processor 130 each have the motion processor for continuously controlling the motion of the actuator, and by these motion processors synchronously calculating the command value, it is possible to execute both the control in accordance with the IEC program 151 and the control in accordance with the application program 152 in synchronization with the control cycle, thereby achieving precise control in the control cycle unit.

Note that when the motor 20 and the robot 30 are subjected to non-synchronization control, the output of the command value from the synchronization control device 10 to the motor 20 and the output of the command value from the synchronization control device 10 to the robot 30 are executed in a non-synchronous state.

Figure 11:
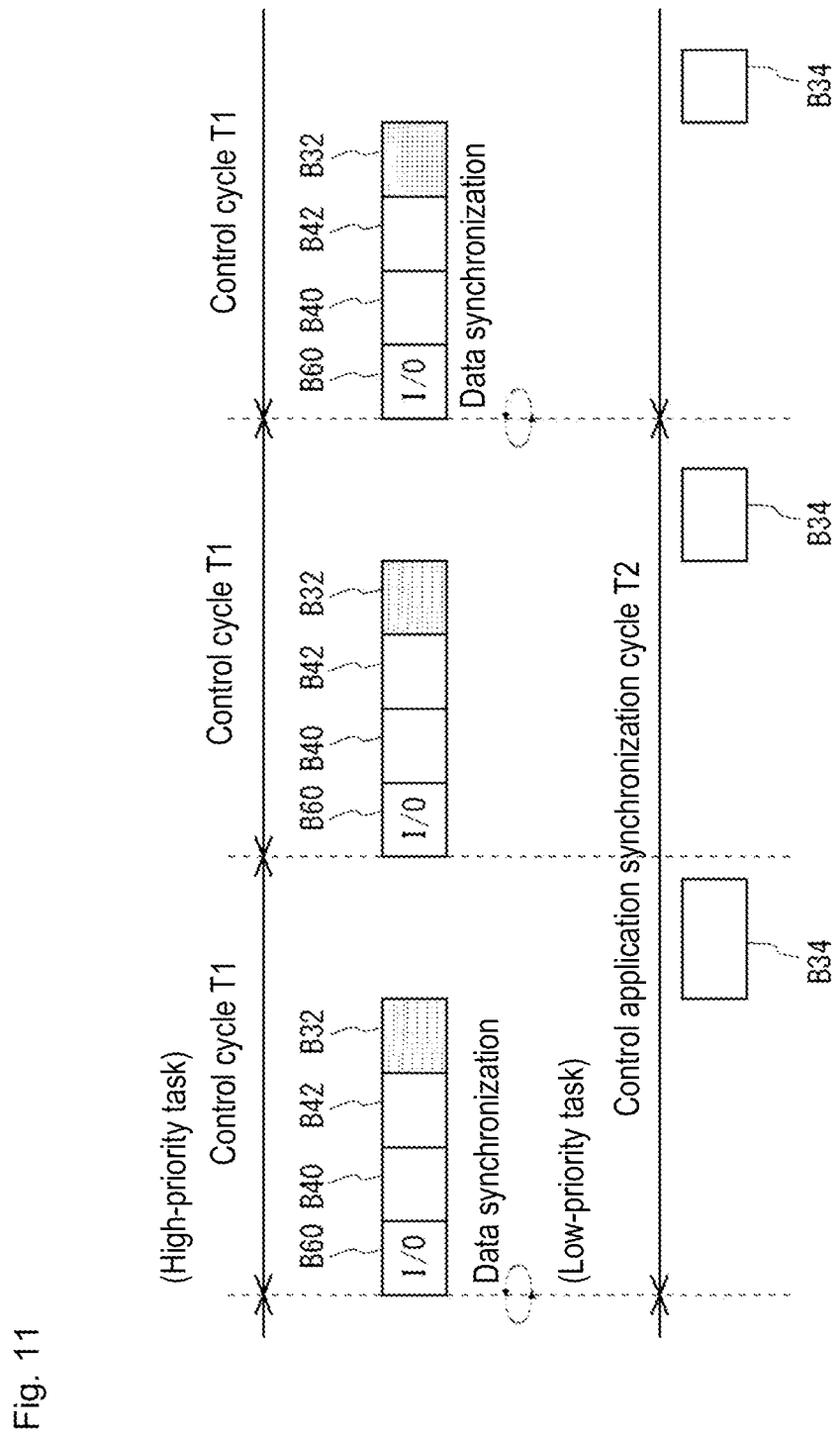
FIG. 11 is a view showing the flow of processing executed in accordance with a control cycle in the synchronization control device shown in FIG. 9.

Now, details of the execution timing of the IEC program 151 and the application program 152 in the synchronization control device 10 at the time of synchronization control will be described based on FIG. 11. FIG. 11 is a view showing an example of the execution timing of the program in the synchronization control device 10. Note that in the synchronization control device 10, a high-priority task (processing in the upper part of FIG. 11) having a high priority and a low-priority task (processing in the lower part of FIG. 11) having a low priority are set in consideration of resources of the processor. Specifically, the execution of the interface 12, the IEC program processor 140, and its motion processor 142, and the execution of the motion processor 132 of the control application processor 130 are set as high-priority tasks, and the execution of the interpreter 134 of the control application processor 130 is set as a low-priority task.

That is, input/output refresh processing B60 associated with the interface 12, execution processing B40 of the IEC program 151, calculation processing B42 of the command value performed by the motion processor 142 in accordance with the IEC program 151, and calculation processing B32 of the command value performed by the motion processor 132 in accordance with the application program 152 are executed as high-priority tasks. On the other hand, processing B34 of sequentially interpreting the application program 152 is executed as a low-priority task.

Here, the high-priority task is repeatedly executed for each predetermined control cycle T1. The low-priority task is executed each time in a period when the high-priority task is not executed within each control cycle. That is, the execution time of the high-priority task is allocated for each control cycle, and the low-priority task is executed at a time other than the execution time of the high-priority task.

First, the high-priority task is described. When each control cycle arrives, the input/output refresh processing B60 is executed, and thereafter the IEC program processor 140 executes (scans) the entire IEC program 151 to calculate one or a plurality of command values regarding sequence control (execution processing B40). At the same time, the motion processor 142 executes motion processing regarding the motion instruction included in the IEC program 151, and calculates one or a plurality of command values regarding the motion instruction (execution processing B42). This execution processing B42 includes the calculation processing by the main axis command calculator Cmm described above.

Furthermore, the motion processor 132 of the control application processor 130 prepares a motion command for controlling the robot 30 in accordance with the intermediate code stored in the buffer 133 (execution processing B32). This execution processing B32 includes the calculation processing by the main axis modeler Mm described above and calculation processing by the driven axis command calculator Cms. Hereinafter, the same processing is repeated for each control cycle. Note that the timing at which the motion processor 132 reads the intermediate code from the buffer 133 does not have to be each control cycle. In a case where the read intermediate code includes an instruction capable of calculating a command value over a plurality of control cycles T1, it is possible to perform the read of the intermediate code at once in the plurality of control cycles T1.

Thus, when the execution of the high-priority task in a certain control cycle is completed, a set of a command value for the servo control of the motor 20 and a command value for the servo control of the robot 30 is prepared. These command values are reflected on the field side when the next control cycle arrives basically. That is, since the IEC program processor 140 and the control application processor 130 calculate command values corresponding to the input data in the identical control cycle, it is possible to output the command values in synchronization.

On the other hand, for the low-priority task, the interpreter 134 of the control application processor 130 sequentially executes the application program 152. That is, the interpreter 134 executes read and analysis of the application program 152 with low priority. The intermediate code generated by the interpreter 134 analyzing and processing the application program 152 is sequentially stored in the buffer 133 in consideration of the capacity of the buffer 133. The intermediate code stored in the buffer 133 is sequentially referred to by the motion processor 132 of the control application processor 130, and is used to generate a command value in the calculation processing B32. At this time, by generating in advance an extra intermediate code that is an integral multiple of the control cycle that is a calculation cycle of the high-priority task, the interpreter 134 can calculate the command value to the control application for each control cycle without affecting the processing by the motion processor 132.

The interpreter 134 suspends the interpretation of the application program 152 before a predetermined control application synchronization cycle (integral multiple of control cycle) arrives. By performing data synchronization between the IEC program processor 140 and the control application processor 130 at the timing of suspending, data having consistency between the both is shared. Thus, the interpreter 134 updates the data shared with the IEC program processor 140 for each synchronization cycle. Along with update of the shared data, input data and output data acquired from the field side may also be updated (data synchronization). This enables the control of the robot 30 to be performed using the data acquired by the IEC program processor 140 even on the control application processor 130 side. The control application synchronization cycle may have any length as long as it is set to an integer multiple of the control cycle. The control application synchronization cycle is appropriately set in accordance with the accuracy of control required in the control application.

Figure 12:
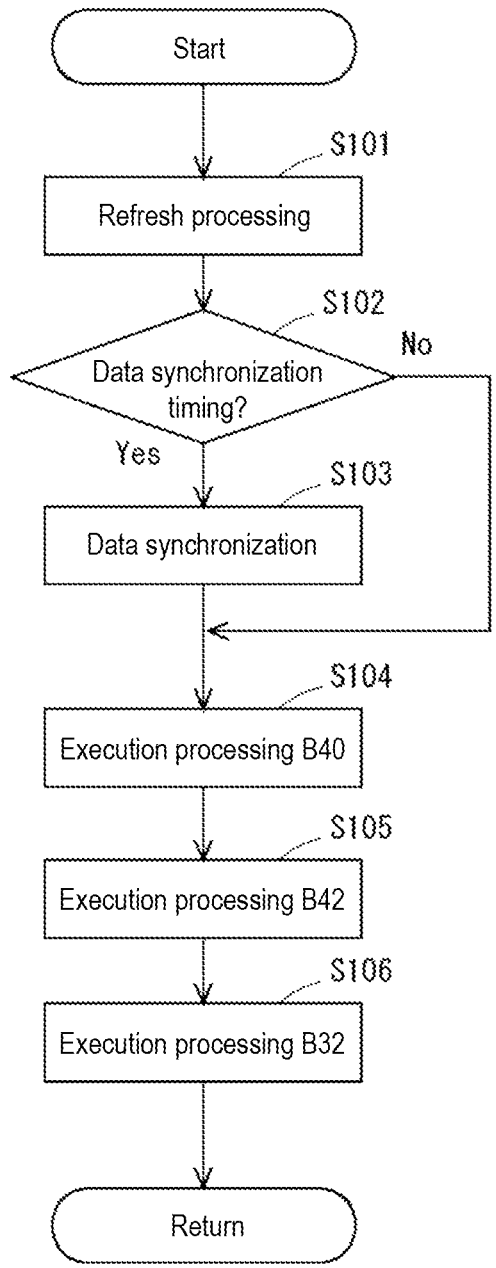
FIG. 12 is a first flowchart regarding synchronization control executed in the synchronization control device shown in FIG. 9.
Figure 13:
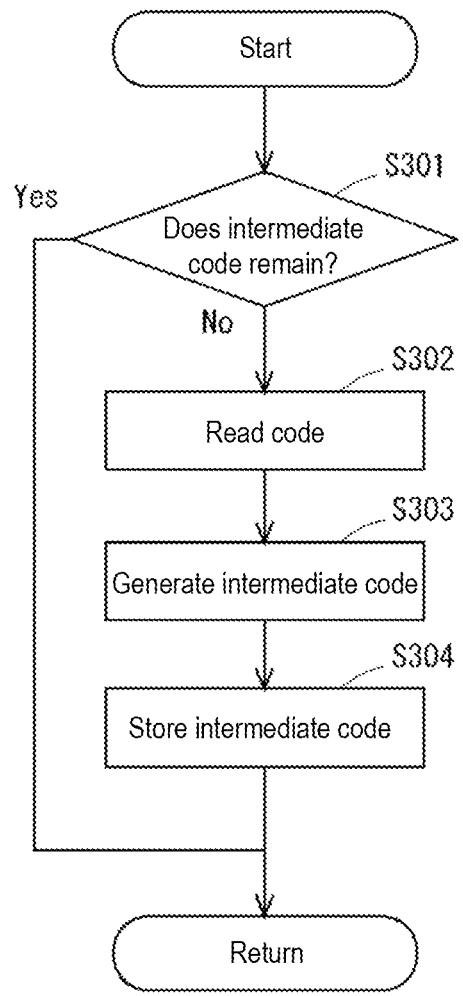
FIG. 13 is a second flowchart regarding synchronization control executed in the synchronization control device shown in FIG. 9.

Next, the flow of processing in synchronization control by the synchronization control device 10 with the motor 20 as main axis servo control equipment and the robot 30 as driven axis servo control equipment will be described based on FIGS. 12 and 13. FIG. 12 is a flowchart regarding the processing of the high-priority task described above. FIG. 13 is a flowchart regarding the processing of the low-priority task described above.

First, the flow of processing of the high-priority task will be described. When the control cycle T1 arrives, the interface 12 executes the input/output refresh processing (processing of S101). As a result, the command value (command value by B40, B42, B32, or the like) calculated in the immediately preceding control cycle T1 is output to the motor 20 and the robot 30, and input data from the motor 20 and the robot 30 is acquired. Subsequently, in S102, it is determined whether or not the current control cycle coincides with the timing of data synchronization. If an affirmative determination is made there, data synchronization is executed between the IEC program processor 140 and the control application processor 130 (processing of S103). If a negative determination is made in S102, the processing proceeds to S104.

Next, the execution processing B40 described above is performed in S104, and subsequently, the execution processing B42 described above is performed in S105. These processing is processing regarding servo control of the motor 20. Thereafter, the execution processing B32 regarding servo control of the robot 30 is performed in S106.

The command value calculated and prepared by the series of processing of the high-priority task shown in FIG. 12 is output to the field when the next control cycle T1 arrives. Then, the low-priority task shown in FIG. 13 is executed in a period after the end of the series of processing before the arrival of the next control cycle T1.

The flow of processing of the low-priority task will be described based on FIG. 13. The low-priority task relates to interpretation processing of the application program 152 by the interpreter 134. First, in S301, the control application processor 130 determines whether or not an intermediate code remains in the buffer 133. The determination is made so as not to generate an intermediate code exceeding the capacity of the buffer 133. If an affirmative determination is made in S301, the low-priority task is ended. If a negative determination is made, the processing proceeds to S302. In S302, the interpreter 134 reads a part of the application program 152. For example, one line of a code constituting the application program 152 is read. Then, in S303, the code read by the interpreter 134 is interpreted to generate an intermediate code. The generated intermediate code is stored in the buffer 133 in S304. Note that regarding the processing of S302 to S304, if there is no application program to be executed, these processing are not performed, and as a result, no intermediate code is stored in the buffer 133. The low-priority task having such series of processing is repeated in a period when the program execution time is allocated to itself.

By performing the series of processing shown in FIGS. 12 and 13, the synchronization control device 10 executes the IEC program 151 and the application program 152 at the execution timing shown in FIG. 11, thereby enabling synchronization control of the motor 20 and the robot 30. Here, returning to FIG. 9, switch from a state in which synchronization control of the motor 20 and the robot 30 is not performed, i.e., a state of non-synchronization control, to a state of performing synchronization control will be described. Note that the switch from the non-synchronization control to the synchronization control is executed by a switcher formed in the controller 11 (see FIG. 1). The switcher performs switch from the non-synchronization control to the synchronization control or switch from the synchronization control to the non-synchronization control on the basis of a command regarding execution or release of the synchronization control included in a control program given to the motor 20 and the robot 30, i.e., the IEC program 151 and the application program 152.

It is assumed that in FIG. 9, when the output point of the field equipment controlled by the motor 20 (hereinafter simply referred to as the "output point of the motor 20") is at a position MP1 and the output point of the robot 30 is at a position SP1, the both are in a non-synchronization control state. When from such state, the output point of the motor 20 follows a locus ML1 and reaches a position MP2 and the output point of the robot 30 follows a locus SL1 and reaches a position SP2, the synchronization control of the both is started, and in a state of performing the synchronization control, the output point of the motor 20 follows a locus ML2 and the output point of the robot 30 follows a locus SL2 parallel to the locus ML2, as shown in FIG. 9. That is, the output points of the motor 20 and the robot 30 are apart from each other in the non-control state, but they are close to the position MP2 and the position SP2, thereby executing synchronization control of the both. Therefore, the switch processing by the switcher is started when the output points of the motor 20 and the robot 30 reach the position MP2 and the position SP2, respectively.

In such case, since the control mode is switched from the non-synchronization control to the synchronization control when the switcher switches the processing, vibration is likely to occur in the robot 30, which is the driven axis servo control equipment. When the vibration occurs, there is a risk of reduction in improvement effect of the follow-up accuracy in the synchronization control by the calculation processing of the main axis command calculator Cmm, the main axis modeler Mm, and the driven axis command calculator Cms, which are described above. Therefore, preferably, in the first transition period at the time of non-synchronization control immediately before the switcher switches from the non-synchronization control to the synchronization control, the switch time command calculator of the synchronization control device 10 calculates the command position of the robot 30 so that the acceleration (in the present application, the concept of acceleration includes deceleration) of each control axis of the robot 30, which is driven axis servo control equipment, continuously changes. The switch time command calculator is a functional unit formed in the controller 11 (see FIG. 1), and the processing of the switch time command calculator will be described based on FIG. 14.

Figure 14:
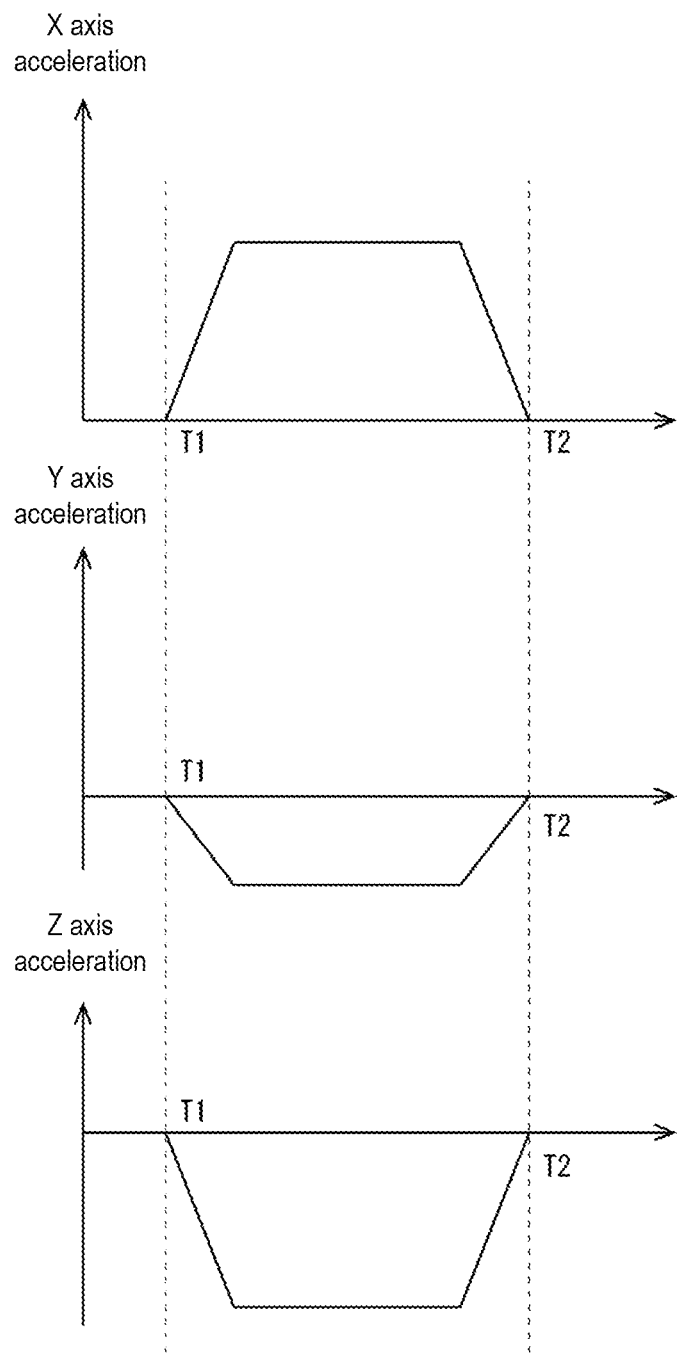
FIG. 14 is a view showing a transition of acceleration of a control axis of a robot when switching from non-synchronization control to synchronization control in the synchronization control device shown in FIG. 9.

FIG. 14 expresses the time transition of the acceleration in each control axis (in the embodiment, X axis, Y axis, and Z axis) of the robot 30. A time T2 shown in FIG. 14 is a time at which the synchronization control of the motor 20 and the robot 30 is started, i.e., a time at which the output points of the motor 20 and the robot 30 reach the position MP2 and the position SP2 in FIG. 9. Then, in the period from a time T1 to the time T2, which is the first transition period immediately before the time T2, the switch time command calculator calculates the command position of each control axis so that the acceleration of each control axis of the robot 30 continuously changes as shown in FIG. 14. By thus calculating the command position of each control axis of the robot 30, the robot 30 can suitably smoothly achieve transition to the synchronization control of each control axis at the timing of switching from the non-synchronization control to the synchronization control, thereby being capable of effectively suppressing vibration of the output point of the robot 30. This is effective for avoiding reduction in follow-up accuracy in synchronization control.

Vibration suppression at the time of switching from the non-synchronization control to the synchronization control has been mentioned in the above embodiment. However, by similarly calculating the command position of each control axis of the robot 30 also at the time of switching from the synchronization control to the non-synchronization control, the switch time command calculator can suppress vibration of the output point of the robot 30. That is, in the second transition period at the time of non-synchronization control immediately after the time when the synchronization control of the motor 20 and the robot 30 is ended, i.e., the time when the synchronization control is switched to the non-synchronization control, the switch time command calculator may calculate the command position of each control axis so that the acceleration of each control axis of the robot 30 continuously changes.

Note that the lengths of the first transition period and the second transition period are only required to be appropriately set to a period suitable for suppressing vibration of the output point of the robot 30 as long as the instructed synchronization control can be achieved. The calculation of the command position by the switch time command calculator does not necessarily need to be performed on all the control axes of the robot 30. As long as suppressing the vibration of the output point of the robot 30, the switch time command calculator may perform calculation of the command position in some of the control axes of the robot 30.

[Implementation Example by Software]

The functional blocks (in particular, main axis command calculator Cmm, main axis modeler Mm, driven axis command calculator Cms, model information acquisitor 52, dynamic characteristic model information acquisitor 53, dynamic characteristic model information generator 54, IEC program processor 140, and control application processor 130) of the synchronization control device 10 or the functional block (in particular, function block of simulation processor 61) of the simulation device 60 may be implemented by a logic circuit (hardware) formed on an integrated circuit (IC chip) or the like, or may be implemented by software.

The present invention is not limited to the embodiments described above, and various variations can be made within the scope of the claims. Embodiments obtained by appropriately combining the technical means disclosed in the different embodiments are also included in the technical scope of the present invention.

<Supplementary Note 1>

A synchronization control device including:

a main axis command calculator (Cmm) that calculates a main axis command position with respect to a main axis servo control mechanism (20) based on time-series target position information with respect to the main axis servo control mechanism (20);

a main axis modeler (Mm) that calculates a predicted main axis feedback position of the main axis servo control mechanism (20) by a dynamic characteristic model of the main axis servo control mechanism (20) by inputting the main axis command position, a main axis feedback position of the main axis servo control mechanism (20), and a predicted main axis command position after a predetermined time calculated based on the target position information; and a driven axis command calculator (Cms) that calculates a driven axis command position with respect to a driven axis servo control mechanism (30) based on a predicted main axis feedback position of the main axis servo control mechanism (20) calculated by the main axis modeler (Mm).

<Supplementary Note 2>

A synchronization control method including:

a main axis command calculation step of calculating a main axis command position with respect to a main axis servo control mechanism (20) based on time-series target position information with respect to the main axis servo control mechanism (20);

a main axis model calculating step of calculating a predicted main axis feedback position of the main axis servo control mechanism (20) by a dynamic characteristic model of the main axis servo control mechanism (20) by inputting the main axis command position, a main axis feedback position of the main axis servo control mechanism (20), and a predicted main axis command position after a predetermined time calculated based on the target position information; and a driven axis command calculation step of calculating a driven axis command position with respect to a driven axis servo control mechanism (30) based on a predicted main axis feedback position of the main axis servo control mechanism (20) calculated by the main axis modeler.

DESCRIPTION OF SYMBOLS 1, 2 synchronization control system
10, 50 synchronization control device
11, 51 controller
52 model information acquisitor
53 dynamic characteristic model information acquisitor
54 dynamic characteristic model information generator
12 interface
13 recorder
20 main axis servo control mechanism (motor)
30 driven axis servo control mechanism (robot)
40 communication network
60 simulation device
61 simulation processor
62 interface
63 recorder
64 display
65 receiver
66 transmitter
130 control application processor
140 IEC program processor
151 IEC program
152 application program
Cmm main axis command calculator
Cms driven axis command calculator
Mm main axis modeler
Cm main axis controller
Pm main axis motor (main axis)
Cs driven axis controller
Ps driven axis motor (driven axis)
Sm main axis servo control mechanism simulator
Ss driven axis servo control mechanism simulator

The invention claimed is:

1. A synchronization control device comprising:

a main axis command calculator configured to calculate a main axis command position with respect to a main axis servo control mechanism based on time-series target position information with respect to the main axis servo control mechanism;

a main axis modeler configured to calculate a predicted main axis feedback position of the main axis servo control mechanism by a dynamic characteristic model of the main axis servo control mechanism by inputting the main axis command position, a main axis feedback position of the main axis servo control mechanism, and a predicted main axis command position after a predetermined time calculated based on the target position information; and a driven axis command calculator configured to calculate a driven axis command position with respect to a driven axis servo control mechanism based on the predicted main axis feedback position of the main axis servo control mechanism calculated by the main axis modeler, wherein the driven axis servo control mechanism has a plurality of control axes, and the synchronization control device further comprises:

a switch unit configured to switch between synchronization control of the main axis servo control mechanism and the driven axis servo control mechanism, in which processing by the main axis command calculator and processing by the main axis modeler are performed, and non-synchronization control in which the synchronization control is not performed; and a switch time command calculator configured to calculate the driven axis command position with respect to the driven axis servo control mechanism so that an acceleration of each control axis of the plurality of control axes of the driven axis servo control mechanism continuously changes in a first transition period immediately before the switch unit switches from the non-synchronization control to the synchronization control and/or in a second transition period immediately after the synchronization control is switched to the non-synchronization control.

2. The synchronization control device according to claim 1, further comprising:

a recorder configured to store a dynamic characteristic model of a servo control mechanism of a plurality of types; and a dynamic characteristic model information acquisitor configured to select and acquire the dynamic characteristic model of the main axis servo control mechanism from the dynamic characteristic model of the servo control mechanism of the plurality of types stored in the recorder.

3. The synchronization control device according to claim 1, further comprising a dynamic characteristic model information acquisitor configured to acquire the dynamic characteristic model of the main axis servo control mechanism via a communication network.

4. The synchronization control device according to claim 2, further comprising:

a model information acquisitor configured to acquire model information of the main axis servo control mechanism connected to the synchronization control device, wherein the dynamic characteristic model information acquisitor acquires the dynamic characteristic model of the main axis servo control mechanism corresponding to the model information of the main axis servo control mechanism acquired by the model information acquisitor.

5. The synchronization control device according to claim 1, further comprising a dynamic characteristic model information generator configured to generate the dynamic characteristic model of the main axis servo control mechanism by operating the main axis servo control mechanism connected to the synchronization control device.

6. A simulation device connected to the synchronization control device according to claim 1, the simulation device comprising:

a simulation processor configured to execute simulation of the main axis feedback position in the main axis servo control mechanism and a driven axis feedback position in the driven axis servo control mechanism with respect to a plurality of predetermined times different from each other, by simulating operations of the main axis command calculator, the main axis modeler, the driven axis command calculator, the main axis servo control mechanism, and the driven axis servo control mechanism for the plurality of predetermined times different from each other;

a display configured to display a plurality of simulation results with respect to the plurality of predetermined times different from each other by the simulation processor;

a receiver configured to receive, from a user, an input that selects any of the plurality of simulation results; and a transmitter configured to transmit a parameter corresponding to the selected simulation result received by the receiver to the synchronization control device.

7. A synchronization control system comprising:

the synchronization control device according to claim 1;

the main axis servo control mechanism connected to the synchronization control device; and the driven axis servo control mechanism connected to the synchronization control device.

8. The synchronization control device according to claim 3, further comprising:

a model information acquisitor configured to acquire model information of the main axis servo control mechanism connected to the synchronization control device, wherein the dynamic characteristic model information acquisitor acquires the dynamic characteristic model of the main axis servo control mechanism corresponding to the model information of the main axis servo control mechanism acquired by the model information acquisitor.

9. A synchronization control method comprising:

a main axis command calculation step of calculating a main axis command position with respect to a main axis servo control mechanism based on time-series target position information with respect to the main axis servo control mechanism;

a main axis model calculating step of calculating a predicted main axis feedback position of the main axis servo control mechanism by a dynamic characteristic model of the main axis servo control mechanism by inputting the main axis command position, a main axis feedback position of the main axis servo control mechanism, and a predicted main axis command position after a predetermined time calculated based on the target position information; and a driven axis command calculation step of calculating a driven axis command position with respect to a driven axis servo control mechanism based on the predicted main axis feedback position of the main axis servo control mechanism calculated by the main axis model calculating step, wherein the driven axis servo control mechanism has a plurality of control axes, and the synchronization control method further comprises:

a step of switching between synchronization control of the main axis servo control mechanism and the driven axis servo control mechanism, in which processing in the main axis command calculation step and processing in the main axis model calculating step are performed, and non-synchronization control in which the synchronization control is not performed; and the step of calculating the driven axis command position with respect to the driven axis servo control mechanism so that an acceleration of each control axis of the plurality of control axes of the driven axis servo control mechanism continuously changes in a first transition period immediately before switching from the non-synchronization control to the synchronization control and/or in a second transition period immediately after the synchronization control is switched to the non-synchronization control.

* * * * *